United States Patent
Kingsbury

[19]
[11] Patent Number: 6,086,099
[45] Date of Patent: Jul. 11, 2000

[54] TRAILER LANDING GEAR LIFTING APPARATUS

[75] Inventor: Richard A. Kingsbury, Los Gatos, Calif.

[73] Assignee: Quest Transportation Products, Inc., Pleasanton, Calif.

[21] Appl. No.: 09/075,495

[22] Filed: May 8, 1998

[51] Int. Cl.[7] .................................................. B60S 9/04
[52] U.S. Cl. .................. 280/766.1; 254/419; 254/423
[58] Field of Search ........................ 280/763.1, 765.1, 280/766.1; 254/419, 423, 424, 425; 81/121.1, 122, 123, 124.1, 125, 124.6

[56] References Cited

U.S. PATENT DOCUMENTS

| | | |
|---|---|---|
| 2,959,395 | 11/1960 | Strack et al. . |
| 3,201,087 | 8/1965 | Dalton . |
| 3,726,543 | 4/1973 | Dalton . |
| 4,116,315 | 9/1978 | Vandenburg . |
| 4,318,550 | 3/1982 | Jacobsen . |
| 4,345,779 | 8/1982 | Busby . |
| 4,400,986 | 8/1983 | Swanson et al. . |
| 4,402,526 | 9/1983 | Huetsch . |
| 4,466,637 | 8/1984 | Nelson . |
| 4,928,488 | 5/1990 | Hunger . |
| 5,004,267 | 4/1991 | Busby . |
| 5,050,845 | 9/1991 | Aline et al. . |
| 5,112,182 | 5/1992 | Nuttall . |
| 5,299,829 | 4/1994 | Rivers, Jr. et al. . |
| 5,427,002 | 6/1995 | Edman . |
| 5,451,076 | 9/1995 | Burkhead . |
| 5,911,437 | 6/1999 | Lawrence ............................ 280/766.1 |

FOREIGN PATENT DOCUMENTS

41 27 791 A1  2/1993  Germany .

*Primary Examiner*—Kevin Hurley
*Attorney, Agent, or Firm*—Henneman & Saunders; Larry E. Henneman, Jr.

[57] ABSTRACT

A trailer landing gear lifting apparatus (100) for raising and lowering landing gear (10) of a trailer (30) has a wrench (102) connected by an air hose (102, 222) to an air supply line ((212) and, optionally, to an air tank (210). An attachment bracket (104), a keeper arm (106) and a wrench bracket (110) optionally secure the wrench (102) to a pair of I beams (112) of the trailer (30) such that the wrench (102) is affixed to the trailer (30).

5 Claims, 6 Drawing Sheets

TRAILER LANDING GEAR LIFTING APPARATUS

TECHNICAL FIELD

The present invention relates to the field of pneumatically powered mechanical devices and more specifically to an improved pneumatic cranking device. The predominant current usage of the present inventive pneumatic landing gear lift is for raising and lowering the landing gear of semi trailers wherein it is desirable to provide a reliable and inexpensive alternative to hand cranking the landing gear.

BACKGROUND ART

Figure 1:
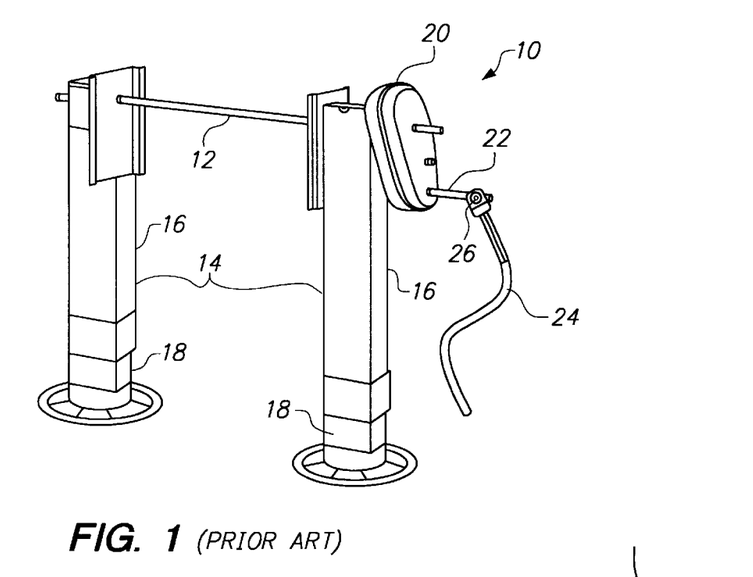
FIG. 1 is a perspective view of a conventional (prior art) landing gear assembly.

Trailers of tractor/trailer combinations have conventionally used landing gear, generally consisting of a pair of retractable legs, at the front ends of the trailers to support such front ends when the tractor is to be detached from the trailer. FIG. 1 depicts a conventional landing gear assembly 10. As can be seen in the view of FIG. 1, the landing gear 10 has a driven shaft 12 which passes through the upper ends of a pair of telescoping legs 14. Each leg 14 has an outer rectangular body 16 in which an inner rectangular portion 18 is telescopically received. Conventional gear mechanisms (not shown) cause the inner rectangular portion 18 to raise or lower, depending upon the direction of rotation of the driven shaft 12. A gear reduction box 20 is conventionally provided as depicted in FIG. 1. The gear reduction box will generally provide two gear ratios, which are generally 1/1 (meaning one inch of lift per rotation of a driving shaft 22) or 40/1 (meaning one inch of lift per forty rotations of the driving shaft 22). On the prior art conventional devices a crank handle 24 is affixed to the driving shaft 22 by a removable pin 26. Accordingly, rotation of the crank handle 24 will selectively raise or lower the legs 14 of the landing gear 10.

As can be appreciated, raising and lowering the landing gear 10 using the manual crank handle 24 is both laborious and time consuming. A number of devices have been devised for raising and lowering the landing gear 10 by powered devices. Most of these have been hydraulically powered, although other power means have been used for the purpose. However, the fact that the old fashioned hand crank still predominates in the field speaks to the fact that known devices are, for one reason or another impractical. To the inventor's knowledge, no practical apparatus for raising and lowering the landing gear 10 is known in the prior art. All prior art attempts have been either too expensive and/or too cumbersome and/or unreliable or difficult to use.

DISCLOSURE OF INVENTION

Accordingly, it is an object of the present invention to provide a landing gear actuating tool which is reliable in operation.

It is another object of the present invention to provide a landing gear actuating tool which is inexpensive to manufacture.

It is yet another object of the present invention to provide a landing gear actuating tool which is easy to use.

It is still another object of the present invention to provide a landing gear actuating tool which is safe to use.

It is yet another object of the present invention to provide a landing gear actuating tool which can be selectively left attached to a trailer during transport thereof or else can be readily detached to be used on other trailers.

Briefly, the preferred embodiment of the present invention is a pneumatically powered tool having a handle, actuating lever and air turbine much like those of conventional pneumatic ratchet wrenches. An inventive gear head/adapter unit is adapted to attach to the driving shaft 26 of the landing gear 10 and to provide the correct rotational motion. The ability to readily select gear ratios in the gear reduction box 20 is retained due to the positive connection between the gear head/adapter unit and the driving shaft 22. A unique bracing unit is affixed between two I beams on the trailer, and the inventive tool is affixed to the bracing unit such that unwanted rotation of the tool is prevented.

An advantage of the present invention is that it is sufficiently simple to be inexpensive enough such that it provides a viable alternative to hand cranking.

A further advantage of the present invention is that it is sufficiently simple to be inexpensive enough such that, if desired, a separate tool can be provided for each trailer and the tool can be left permanently attached to the trailer.

Yet another advantage of the present invention is that it is small and light enough to optionally be left permanently attached to a trailer.

Still another advantage of the present invention is that it is small and light enough to be readily removed from a trailer to be used with other trailers.

Yet another advantage of the present invention is that it is simple and reliable in operation.

These and other objects and advantages of the present invention will become clear to those skilled in the art in view of the description of the best presently known mode of carrying out the invention and the industrial applicability of the preferred embodiment as described herein and as illustrated in the several figures of the drawing.

BEST MODE FOR CARRYING OUT INVENTION

The best presently known mode for carrying out the invention is a trailer landing gear lifting apparatus adapted for raising and lowering the landing gear of semi trailers. The inventive trailer landing gear lifting apparatus is depicted in an elevational view in FIG. 2 affixed to the front end of a trailer 30 and is designated therein by the general reference character 100. The trailer landing gear lifting apparatus 100 has a pneumatic wrench 102, a fixture apparatus 103 having an attachment bracket 104 and a keeper arm 106. The wrench 102 has attached thereto an air hose 108 and a wrench bracket 110 which will be discussed in more detail, hereinafter.

Figure 2:
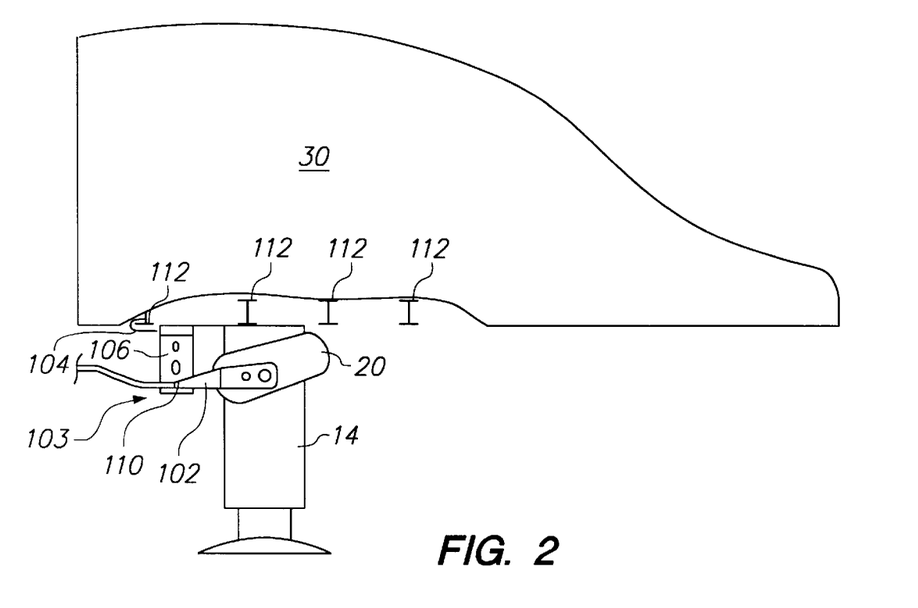
FIG. 2 is an elevational view of the front end of a trailer equipped with a trailer landing gear lifting apparatus according to the present invention.
Figure 3:
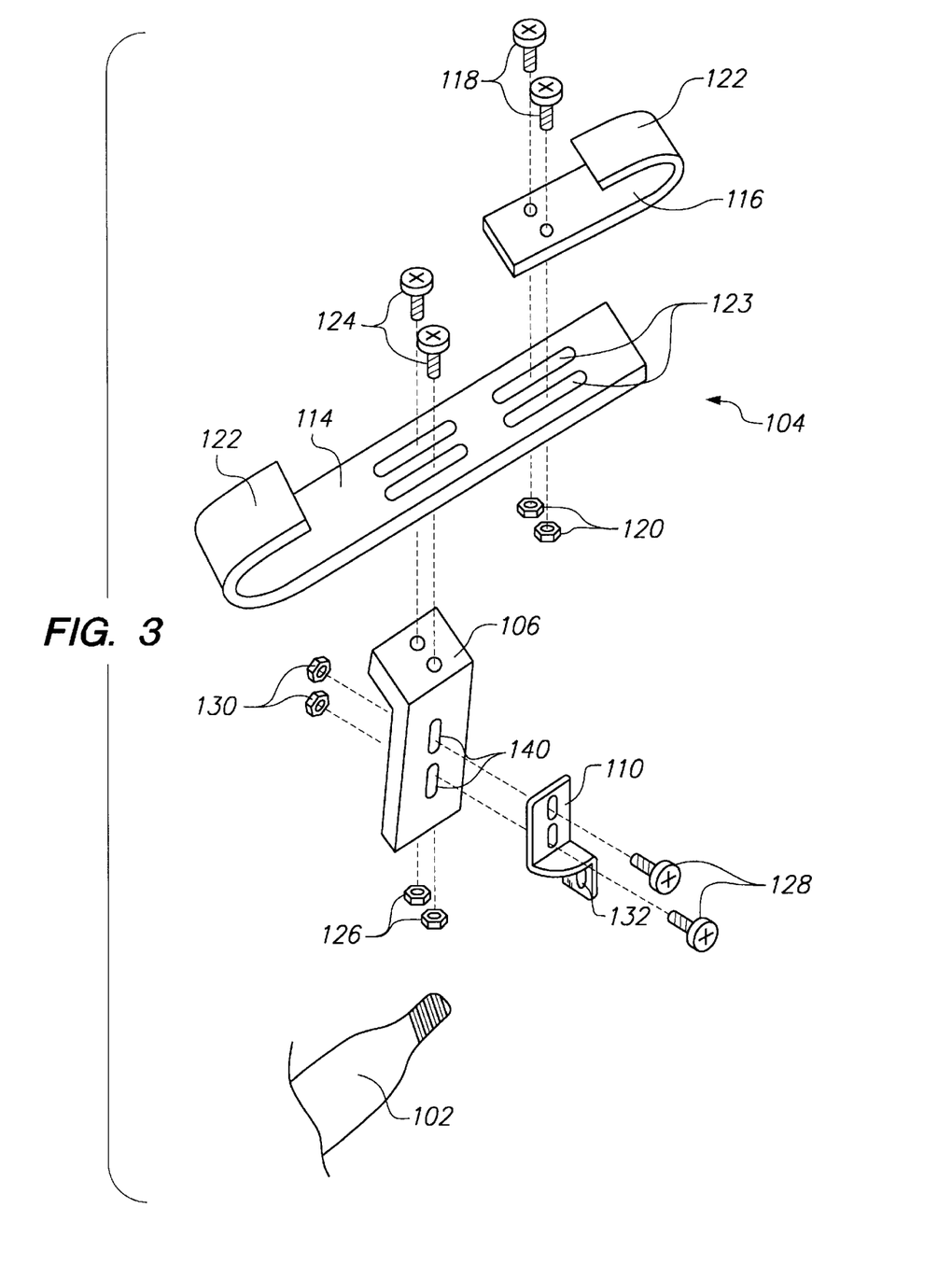
FIG. 3 is an exploded perspective view of the attachment bracket, and related components, of FIG. 2.

The attachment bracket 104 is affixed to two of a plurality of I beams 112 which are a conventional appurtenances of the trailer 30. FIG. 3 is an exploded perspective view of the attachment bracket 104 in which it can be seen that the attachment bracket 104 has a long bracket 114 and a short bracket 116 which are fastened together by a pair of attachment bracket bolts 118 and nuts 120. The long bracket 114 and the short bracket 118 each have a curved end 122 for fastening over the I beams 112 (FIG. 2). In the presently preferred embodiment of the attachment bracket 104, the long bracket 114 is equipped with slots 122 such that the short bracket 116 can be positioned on the long bracket 114 at the correct position such that the assembled attachment bracket 104 will fit correctly over an adjacent pair of the I beams 112 (FIG. 2).

In the view of FIG. 3 can also be seen the keeper arm 106 is affixed to the attachment bracket 104 by a pair of keeper arm bolts 124 and nuts 126. Note that, when correct positioning of parts requires it, the keeper arm bolts 124 and nuts 126 can, in fact, also be the attachment bracket bolts 118 and nuts 120, such that the short bracket 116 and the keeper arm 106 are both fastened to the long bracket 114 through the slots 123 by the same fastening devices.

The wrench bracket 110 is affixed to the keeper arm 106 by a pair of wrench bracket bolts 128 and nuts 130 such that the position of the wrench bracket 110 may be adjusted, according to need, in position on the keeper arm 106. The wrench 102 is fastened to the wrench bracket 110 in a wrench attachment hole 131 in a manner which will be discussed in more detail, hereinafter.

Figure 4:
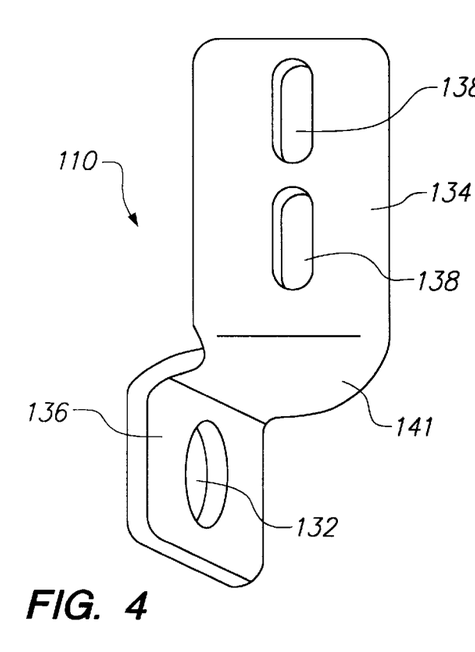
FIG. 4 is a perspective view of a the wrench bracket of FIG. 3.
Figure 5:
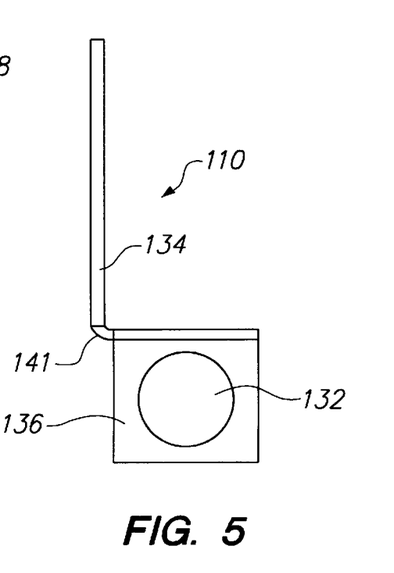
FIG. 5 is a side elevational view of the wrench bracket of FIGS. 3 and 4.

FIGS. 4 and 5 are, respectively, a perspective view and a side elevational view of the wrench bracket 110. As can be seen in the views of FIGS. 4 and 5, the wrench bracket 110 has a long portion 134 for attaching to the keeper arm 106 (FIG. 3) and a short portion 136 wherein is located the wrench attachment hole 132. In this embodiment, the wrench attachment hole 132 is one inch in diameter such that the wrench 102 (FIG. 3) can be affixed therein as will be discussed hereinafter. As can be seen in the view of FIG. 4, the long portion 134 of the wrench bracket 110 has therein slots 138 such that the position of the wrench bracket 110 can be adjusted, as needed, in relation to slots 140 (FIG. 3) on the keeper arm 106. A bent portion 141 rotates the position of the wrench 102 to be generally at a right angle to the face of the keeper arm 106 FIG. 2) such that the wrench 102 will engage with the driving shaft 22 (FIG. 1). It should be noted that the particular shape of the wrench bracket 110 is not intended as a restriction of the invention, and a simpler "L" bracket (not shown) could, alternatively, be used to practice the invention. Similarly, the shape of essentially any of the other components of the inventive trailer landing gear lifting apparatus 100 could be substantially altered while staying within the scope of the present invention.

Figure 6:
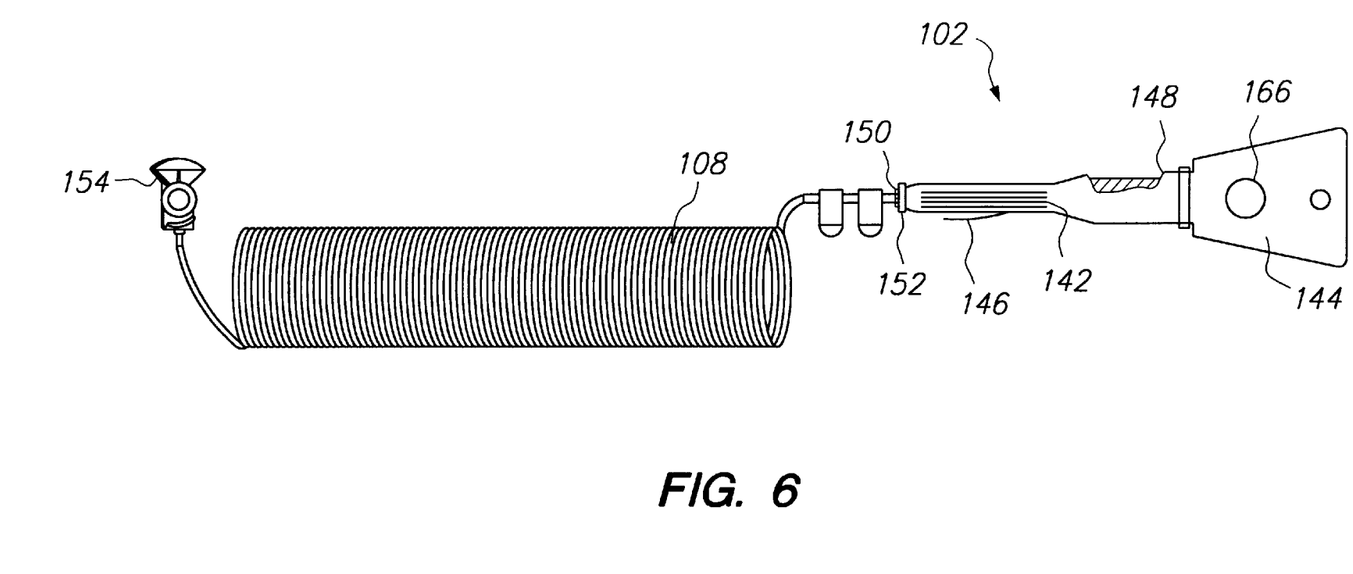
FIG. 6 is a top plan view of the wrench of FIG. 2.

FIG. 6 is a top plan view of the wrench 102 of FIG. 2 with the air hose 108 affixed thereto. In the view of FIG. 6 it can be seen that the wrench 102 has a handle portion 142 and a head portion 144. On the handle portion 142 is an actuating trigger 146 for selectively actuating the wrench 102. The handle portion 142 is a conventional handle portion as found on a conventional pneumatic ratchet wrench (not shown) and will not be discussed in great detail, herein. One skilled in the art will recognize that the handle portion 142 contains an air turbine 148 which supplies rotational power to the head portion 144 when the actuating trigger 146 is depressed.

In the view of FIG. 6 it can also be seen that the wrench 102 has a threaded end 150 onto which is threaded an attachment nut 152. The wrench 102 may, optionally, be affixed to the wrench bracket 110 (FIGS. 4 and 5) by temporarily removing the attachment nut 152, passing the threaded end 150 through the wrench attachment hole 132 (FIGS. 4 and 5) and then replacing the attachment nut 152 onto the threaded end 150 of the wrench 102.

Also in the view of FIG. 6 can be seen a glad hand 154. The glad hand 154 is a conventional, standardized, appurtenance for attaching the air hose 108 to the air supply of a truck (not shown) whereby the wrench 102 can be powered directly from such air supply. Such applications will be discussed in greater detail, hereinafter, in relation to the industrial applicability of the invention.

Figure 7:
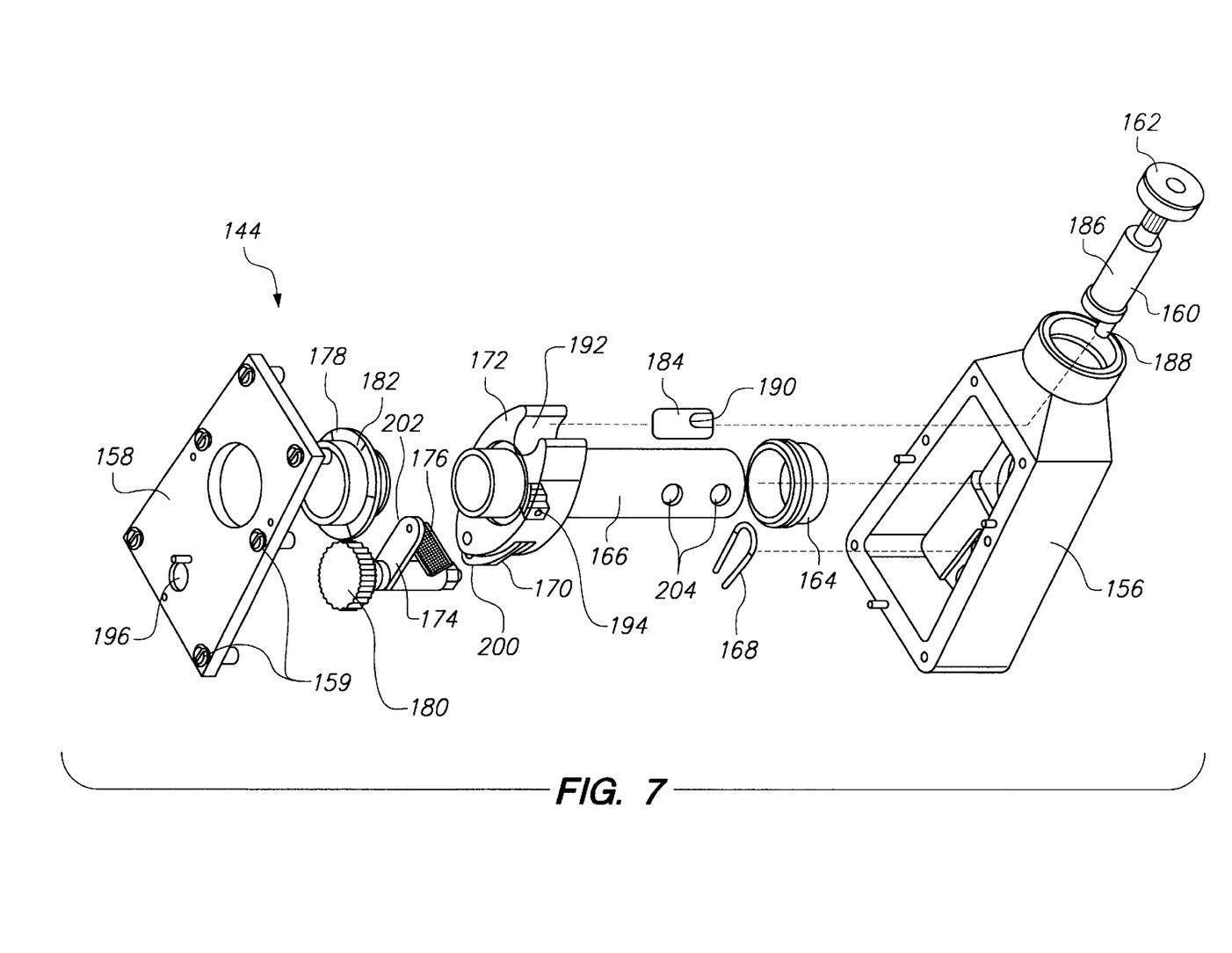
FIG. 7 is a partially cut away exploded perspective view of the head portion of the wrench as depicted in the view of FIG. 6.

FIG. 7 is a partially cut away exploded perspective view of the head portion 144 of the wrench 102 (FIG. 6). In the view of FIG. 7, it can be seen that the head portion 144 has a housing 156 and a lid 158 which is held in place on the housing by a plurality (six, in this embodiment) of attachment screws 159. Assembled in the housing 156 are an eccentric 160, a bearing 162, a sleeve bearing 164, a sleeve 166, a spring wire 168, a pawl 170, a yoke 172, a cam 174, a spring 176, a bearing 178, a dial 180, a wave washer 182 and an eccentric bearing 184. In operation, the eccentric 160 will receive rotational power from the air turbine 148 (FIG. 6) and rotate on the bearing 162. An eccentric shaft 186 has affixed at the end thereof an eccentric projection 188. The eccentric projection 188 fits within an orifice 190 in the eccentric bearing 184, and the eccentric bearing fits within a bearing notch 192 of the yoke. Therefore, one skilled in the art will recognize that when the eccentric 160 is rotated, the eccentric motion of the eccentric projection 188 will cause the yoke 172 to reciprocate about the sleeve 166. In the view of FIG. 7, within a partially cut away portion of the yoke 172 can be seen a gear 194.

One skilled in the art will recognize that the pawl 170 will cause the reciprocal motion of the yoke to rotate the sleeve 166 in one direction, while the pawl 170 slips over the gear 194 as the yoke 172 rotates in the other direction. The knob 180 (which affixed from the outside through a knob hole 196 in the lid 158 when the head portion 144 is assembled) is used by the operator to control the position of the cam 174. The cam 174 is assisted in being held in the position selected by the spring wire 168 which engages an octagonal cam nut 198 rigidly affixed in relation to the cam 174. When assembled, the spring 176 connects the distal end of the cam 174 and the pawl at a pawl connection point 200. In practice, the pawl connection point 200 and a cam connection point 202 are small pins, although small connection holes or the like could be used to connect the respective ends of the spring 176 to the cam 174 and to the pawl 170. A pair of attachment holes 204 are provided in the hollow sleeve 166 such that the sleeve 166 can be slipped over the driving shaft 22 (FIG. 1) and held in place thereon by the removable pin 26 (FIG. 1). It should be noted that two, rather than just one, of the attachment holes 204 are provided merely to provide an option of attachment positions.

Figure 8:
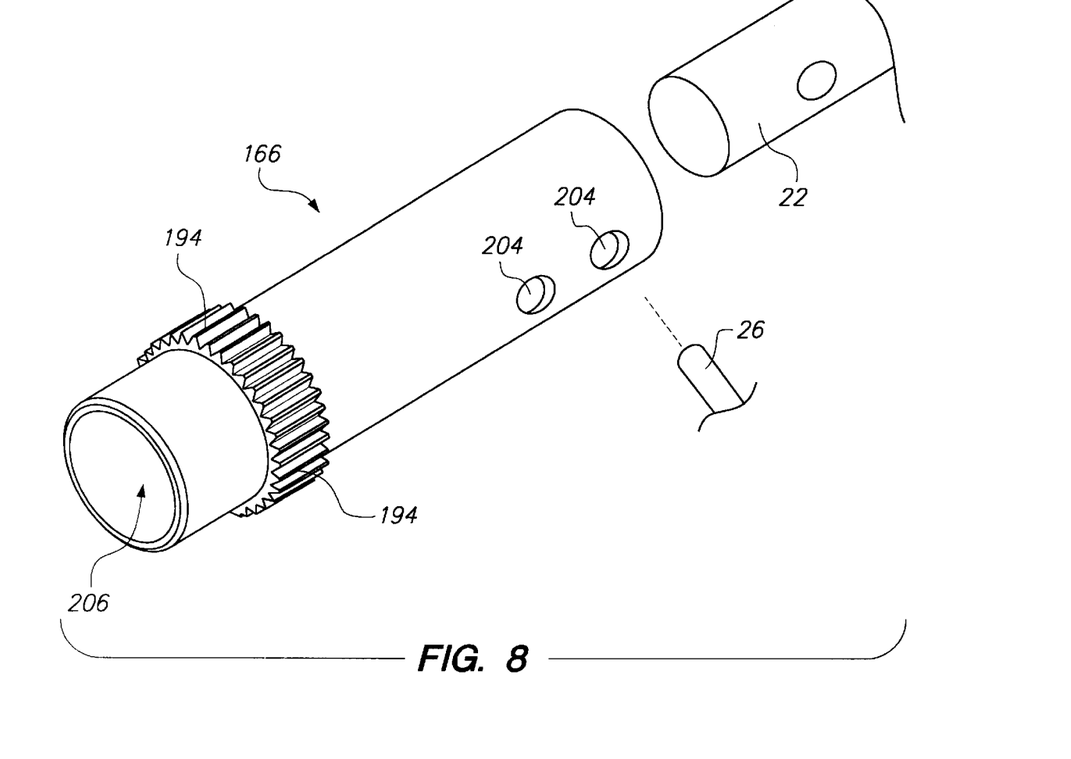
FIG. 8 is a perspective view of the sleeve of FIG. 7.

FIG. 8 is a perspective view of the sleeve of FIG. 7. In the view of FIG. 8, the gear 194, only a part of which can be seen in the view of FIG. 7, can be clearly seen. Also in the view of FIG. 8, it can be seen that the sleeve 166 has a hollow interior 206 for accepting the driving shaft 22 (FIG. 1) such that the sleeve 166 can be secured to the driving shaft 22 (FIG. 1) by placing the removable pin 26 through one of the attachment holes 204.

Figure 9:
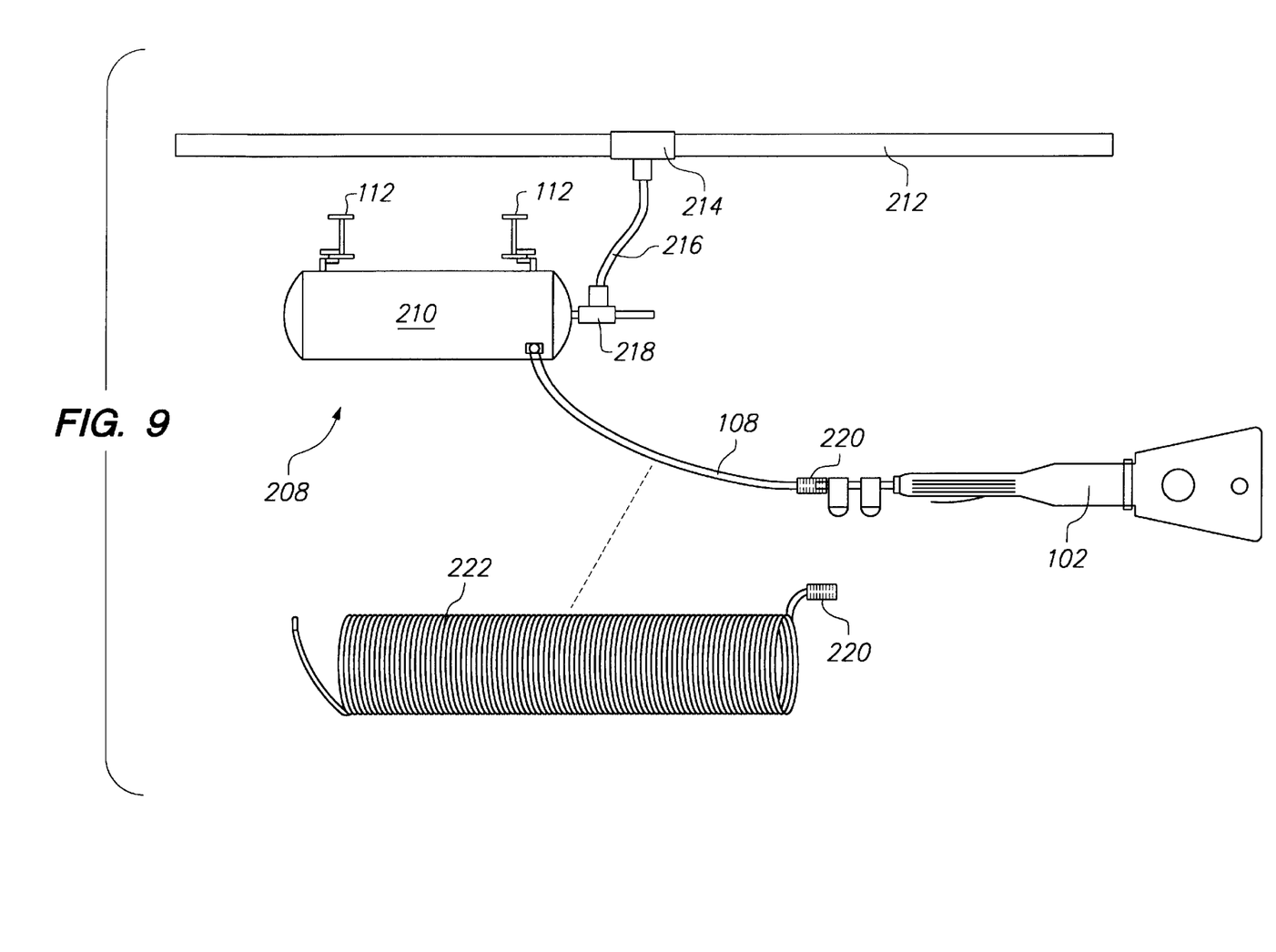
FIG. 9 is a schematic view of an alternative air supply system according to the present invention.

FIG. 9 is a schematic view depicting an alternative air supply system 208 according to the present invention. In the alternative air supply system 208, an air tank is 210 is pressurized from an air supply line 212. The air supply line 212 is an integral part of the trailer 30 (FIG. 2) which is generally used for providing air pressure for brake control, and the like. The air tank 210 is optionally affixed to a pair of the I beams 112—which can be either the same or a different pair of the I beams 112 as compared to the pair of I beams 112 discussed in relation to FIG. 2 which are used for securing the attachment bracket 104 (FIG. 2). A T fitting 214 is fitted to the air supply line 212 for supplying air to the air tank 212 through an air tap tube 216. An air shut off valve 218 is provided to prevent leakage from the air supply line 212 in case of a malfunction or leakage within the present inventive system. In the view of FIG. 9, the air hose 108 takes air from the air tank 210 and is connected to the wrench 102 by a quick connect 220. A coiled air hose 222 may optionally be provided instead of the conventional straight air hose 108 such that other air accessories (not shown) such as a tire fill valve or an air nozzle can be powered form the air tank 210.

As previously mentioned herein, many variations of the present invention are possible. While the best presently known embodiment 100 (FIG. 2) depicted herein depicts components of shape and form having the functionality described, one skilled in the art will readily recognized that variations of such components are possible while keeping within the spirit and scope of the invention.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

INDUSTRIAL APPLICABILITY

The inventive trailer landing gear lifting apparatus 100 is intended to be widely used for raising and lowering the landing gear 10 of trailers 30. It is anticipated by the inventor that the trailer landing gear lifting apparatus 100 will be used in any of several different ways. In a simple example, in some instances there might be no permanent installation at all. The configuration depicted in FIG. 6 could be stored (in a tool box, for example) to be removed and used at will. The glad hand 154 could then be temporarily connected to a truck air supply and the sleeve 166 (FIG. 6) can then be slipped over the driving shaft 22 (after removing the conventional crank handle 24) and fastened in position using the removable pin. Direction of rotation of the sleeve 166 is selected using the dial 180 (FIG. 7) and the actuating trigger 146 is selectively depressed to raise or lower the landing gear 10, as desired. Because the wrench is affixed to the driving shaft 22 using the removable pin 26, the gear ratio of the gear reduction box 20 can be selected by pushing or pulling the wrench 102.

It should be noted that the above described procedure may not be applicable in all situations. For example, where a truck does not have means for revving up the engine during the procedure, there may not be sufficient air pressure available to use this simple method. In such situations, the alternative air supply system 208 of FIG. 9 (or some variation thereof) may be employed such that air is stored in the air tank 210 so that the wrench 102 can be operated even when sufficient pressure is not immediately available at the air supply line 212.

The optional alternative air supply system 208 can be used with or without the attachment bracket 104, the keeper arm 106, the wrench bracket 110, and associated equipment as discussed herein in relation to FIG. 3. It is anticipated that the apparatus and method as described herein in relation to FIG. 3 will result in a more permanent installation such that the wrench 102 will essentially always be in place on the landing gear 10, and the driver will need only set the direction of rotation of the sleeve 166 using the dial 180 (FIG. 7) and then selectively depress the actuating trigger 146 to raise or lower the landing gear 10.

Since the trailer landing gear lifting apparatus 100 of the present invention may be readily produced and used with essentially any semi trailer, and since the advantages as described herein are provided, it is expected that it will be readily accepted in the industry. For these and other reasons, it is expected that the utility and industrial applicability of the invention will be both significant in scope and long lasting in duration.

What I claim is:

1. A trailer landing gear lifting device for actuating the landing gear of a semi trailer, comprising:
    a wrench having a sleeve adapted for connecting to and selectively turning a drive shaft of the landing gear; and
    a bracket connected to said wrench and adapted for affixing said wrench to the semi trailer, wherein,
        the bracket includes an extendable attachment portion connected to the bracket with curved ends adapted for hooking a pair of I beams of the trailer.

2. The trailer landing gear lifting device of claim 1, and further including:
    a keeper arm for extending from the attachment portion to the wrench.

3. The trailer landing gear lifting device of claim 1, and further including:
    a wrench attachment bracket for connecting the wrench generally at a right angle to the keeper arm.

4. A trailer landing gear lifting tool for rotating a drive shaft of a trailer landing gear, the tool comprising:
    a wrench having a sleeve adapted for enraging the drive shaft;
    a pin adapted for securing the sleeve to the drive shaft by inserting the pin in a hole of the drive shaft such that the drive shaft can selectively be pushed in or pulled out by pushing and pulling the tool;
    a knob for selecting the direction of rotation of the sleeve;
    a trigger for actuating the sleeve in a direction selected by the knob;
    a fixture apparatus connected to the wrench adapted for securing the wrench to the trailer, wherein the fixture apparatus includes;
        an attachment bracket adapted for attaching to the trailer; and
        a keeper arm adapted for spanning between the attachment bracket and the wrench.

5. A trailer landing gear lifting tool for rotating a drive shaft of a trailer landing gear, the tool comprising:
    a wrench having a sleeve adapted for engaging the drive shaft;
    a pin adapted for securing the sleeve to the drive shaft by inserting the pin in a hole of the drive shaft such that the drive shaft can selectively be pushed in or pulled out by pushing and pulling the tool;
    a knob on the wrench for selecting the direction of rotation of the sleeve;

a trigger for actuating the sleeve in a direction selected by the knob;

a fixture apparatus connected to the wrench adapted for securing the wrench to the trailer, wherein the fixture apparatus includes two curved ends adapted for attachment to two I beams of the trailer.

* * * * *

UNITED STATES PATENT AND TRADEMARK OFFICE
CERTIFICATE OF CORRECTION

PATENT NO : 6,086,099

DATED : 7/11/2000

INVENTOR(S) : Kingsbury

It is certified that error appears in the above-identified patent and that said Letters Patent are hereby corrected as shown below:

Column 6, line 41, the portion reading "for enraging" should read --for engaging--.

Signed and Sealed this

Twenty-second Day of May, 2001

*Attest:*

NICHOLAS P. GODICI

*Attesting Officer*  *Acting Director of the United States Patent and Trademark Office*